US008361185B2

(12) United States Patent
Kottegoda et al.

(10) Patent No.: US 8,361,185 B2
(45) Date of Patent: Jan. 29, 2013

(54) COMPOSITIONS FOR SUSTAINED RELEASE OF AGRICULTURAL MACRONUTRIENTS AND PROCESS THEREOF

(75) Inventors: Nilwala Kottegoda, Horana (LK); Imalka Munaweera, Haputhale (LK); A. Nadeesh Madusanka, Battaramulla (LK); Veranja Karunaratne, Kandy (LK)

(73) Assignee: Sri Lanka Istitute of Nanatechnology (PVT) Ltd., Biyagama Export Processing Zone, Walgama, Malwana (LK)

( * ) Notice: Subject to any disclaimer, the term of this patent is extended or adjusted under 35 U.S.C. 154(b) by 265 days.

(21) Appl. No.: 12/794,741

(22) Filed: Jun. 5, 2010

(65) Prior Publication Data

US 2011/0296885 A1 Dec. 8, 2011

(51) Int. Cl.
*C05C 9/00* (2006.01)
*C05C 11/00* (2006.01)
(52) U.S. Cl. ......... 71/29; 71/33; 71/54; 71/58; 71/64.13
(58) Field of Classification Search ................ 71/31–42, 71/29, 54, 64.13, 58
See application file for complete search history.

(56) References Cited

U.S. PATENT DOCUMENTS

| | | | |
|---|---|---|---|
| 3,902,886 A | 9/1975 | Banin | |
| 4,219,349 A | 8/1980 | Bardsley | |
| 4,849,006 A | 7/1989 | Knudson, Jr. et al. | |
| 5,433,766 A * | 7/1995 | Ming et al. ........................ | 71/36 |
| 6,261,997 B1 | 7/2001 | Rubin et al. | |
| 6,726,934 B1 | 4/2004 | Prokop et al. | |
| 6,821,928 B2 | 11/2004 | Ruskin | |
| 7,211,275 B2 | 5/2007 | Ying et al | |
| 7,252,697 B2 | 8/2007 | Liao et al. | |
| 2004/0091417 A1 | 5/2004 | Yadav | |
| 2004/0231231 A1 | 11/2004 | Cataldo et al. | |
| 2009/0169524 A1 | 7/2009 | Katti et al. | |

OTHER PUBLICATIONS

Kim, K. S., Suppression of fertilizer N loss through massive urea intercalation into montmorillonite, Kyungpook National University, Thesis, 2009.

* cited by examiner

*Primary Examiner* — Wayne Langel
(74) *Attorney, Agent, or Firm* — Alston & Bird LLP

(57) ABSTRACT

A macronutrient sustained release composition for a plant locus containing a nanocomposite wherein a nitrogen containing macronutrient compound adsorbed on the surface of hydroxy apatite phosphate nanoparticles is intercalated within the interlayer spacing of a nanoclay. The nanocomposite containing the adsorbed macronutrient compounds is slowly released in a sustained manner when contacted with an acidic soil.

20 Claims, 19 Drawing Sheets

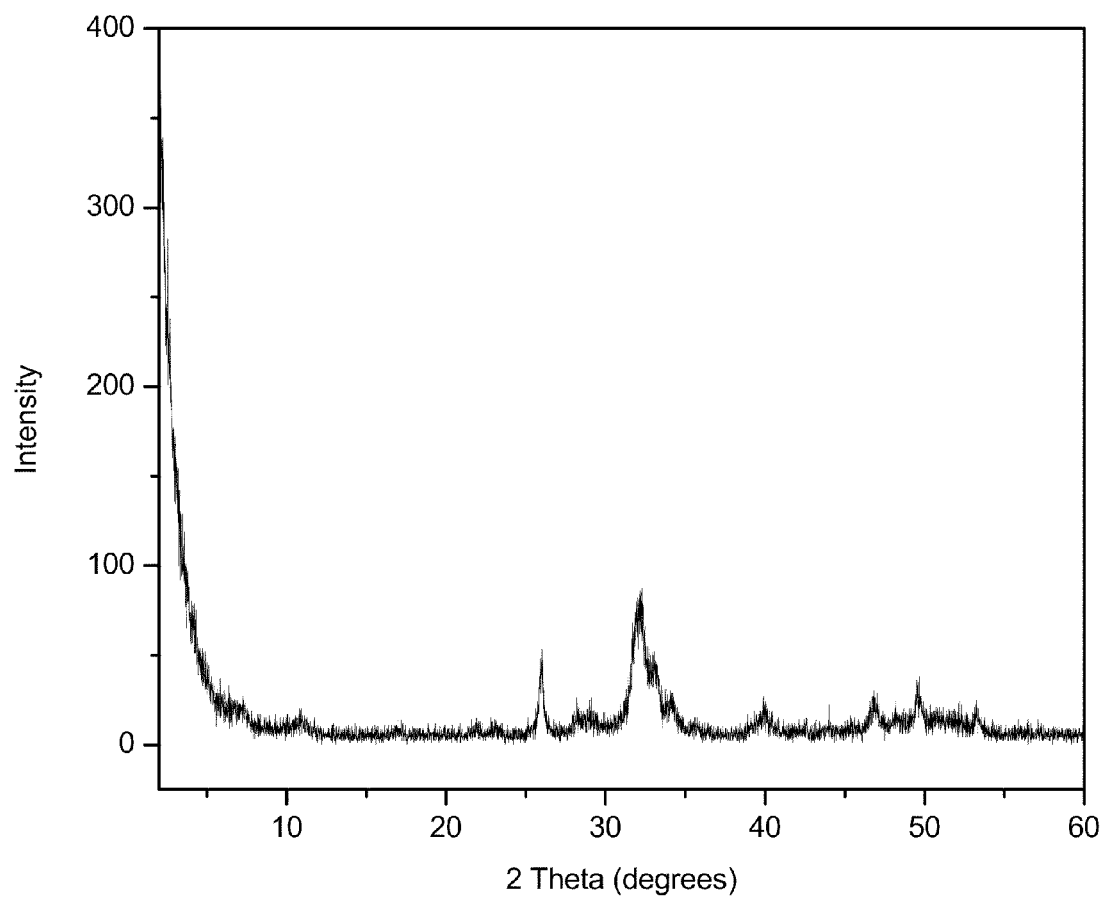
Figure1: XRD pattern of synthesized HAP nanoparticles

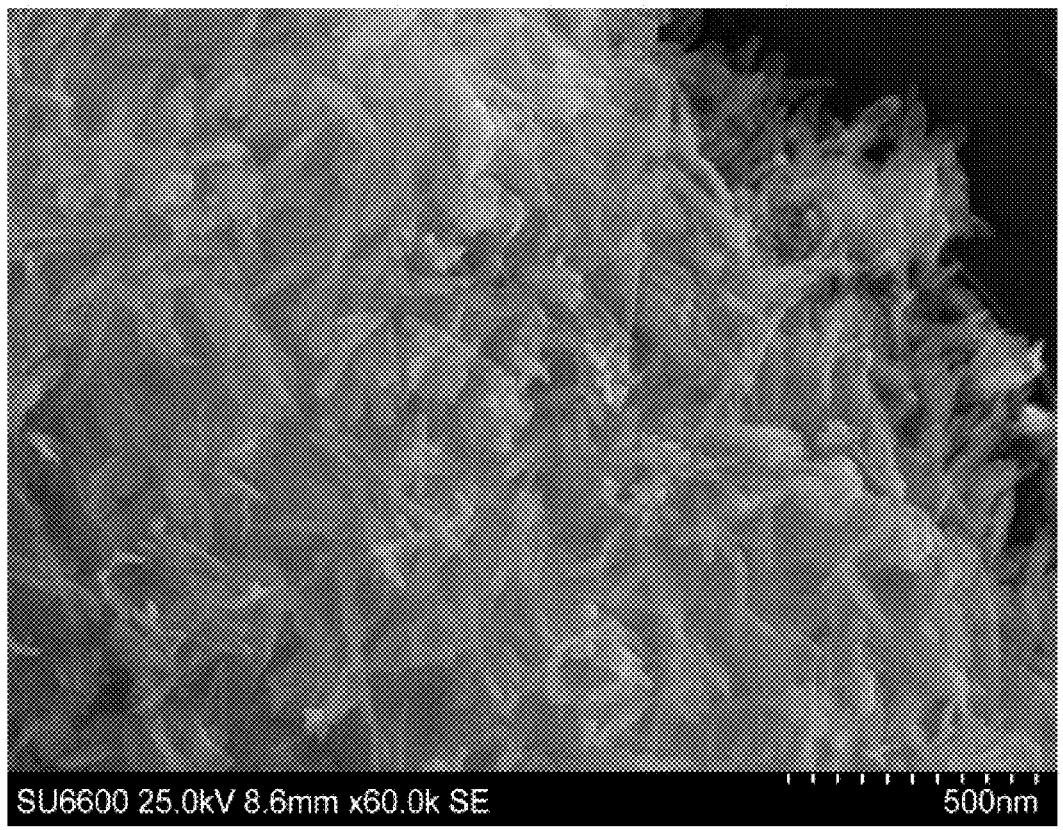
Figure 2: SEM image of synthesized HAP nanoparticles

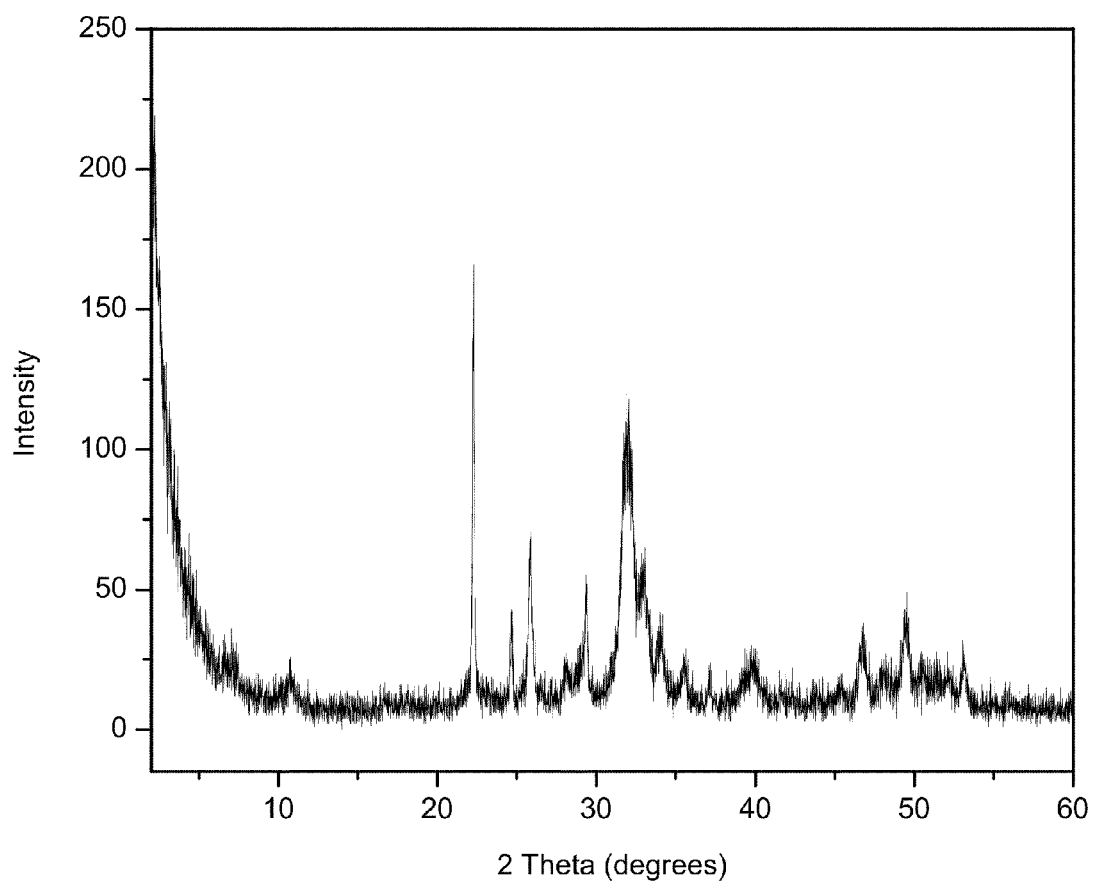
Figure 3: XRD pattern of the urea adsorbed HAP nanoparticles

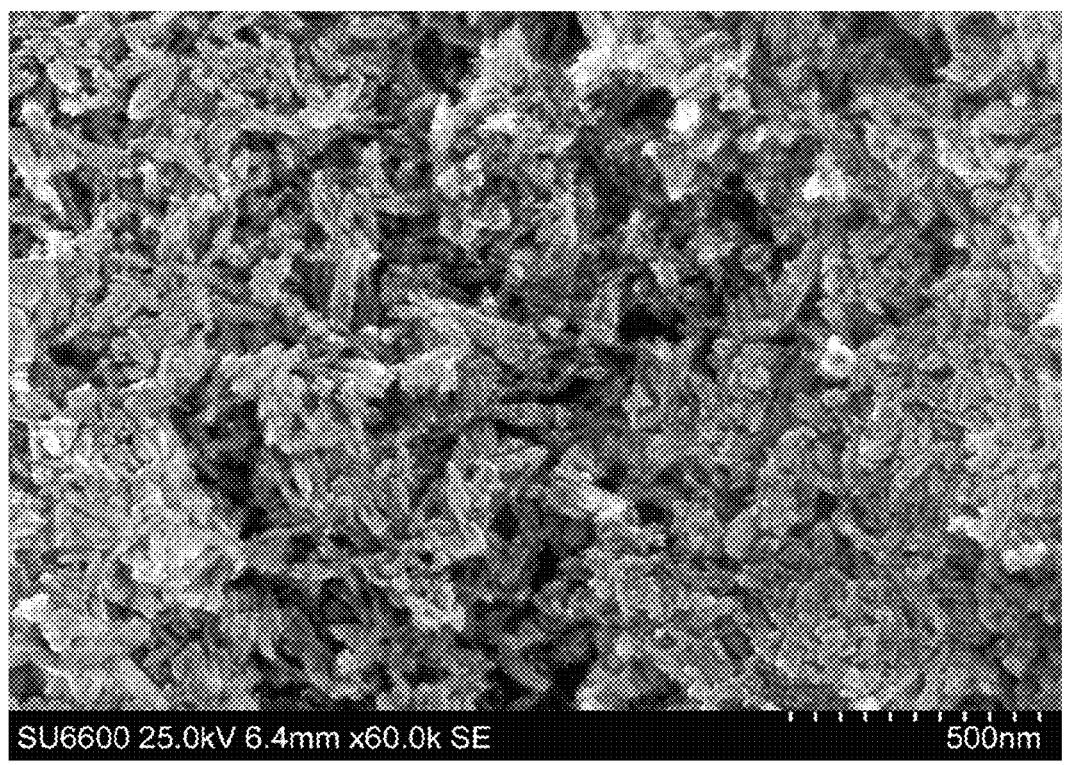
Figure 4: SEM image of urea adsorbed HAP nanoparticles

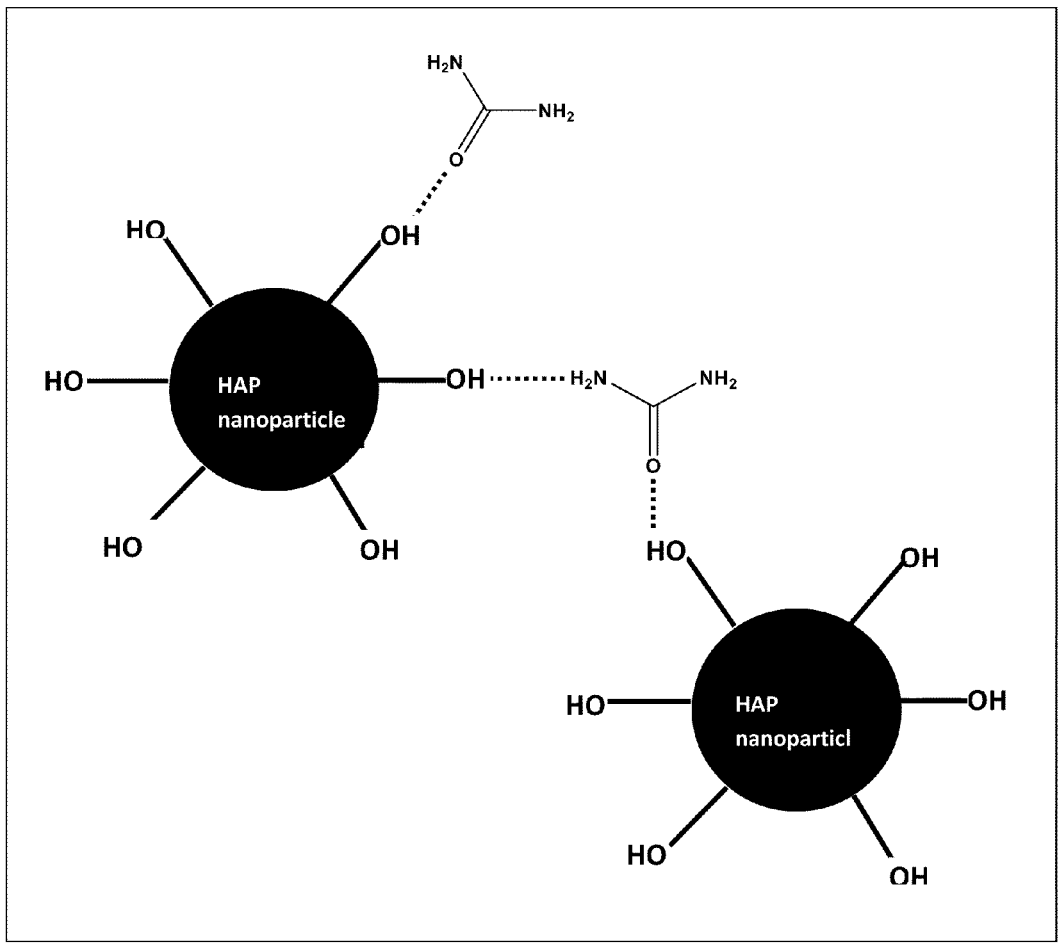
Figure 5: Schematic representation (Not drawn to scale) of the structure of the urea adsorbed HAP nanoparticles

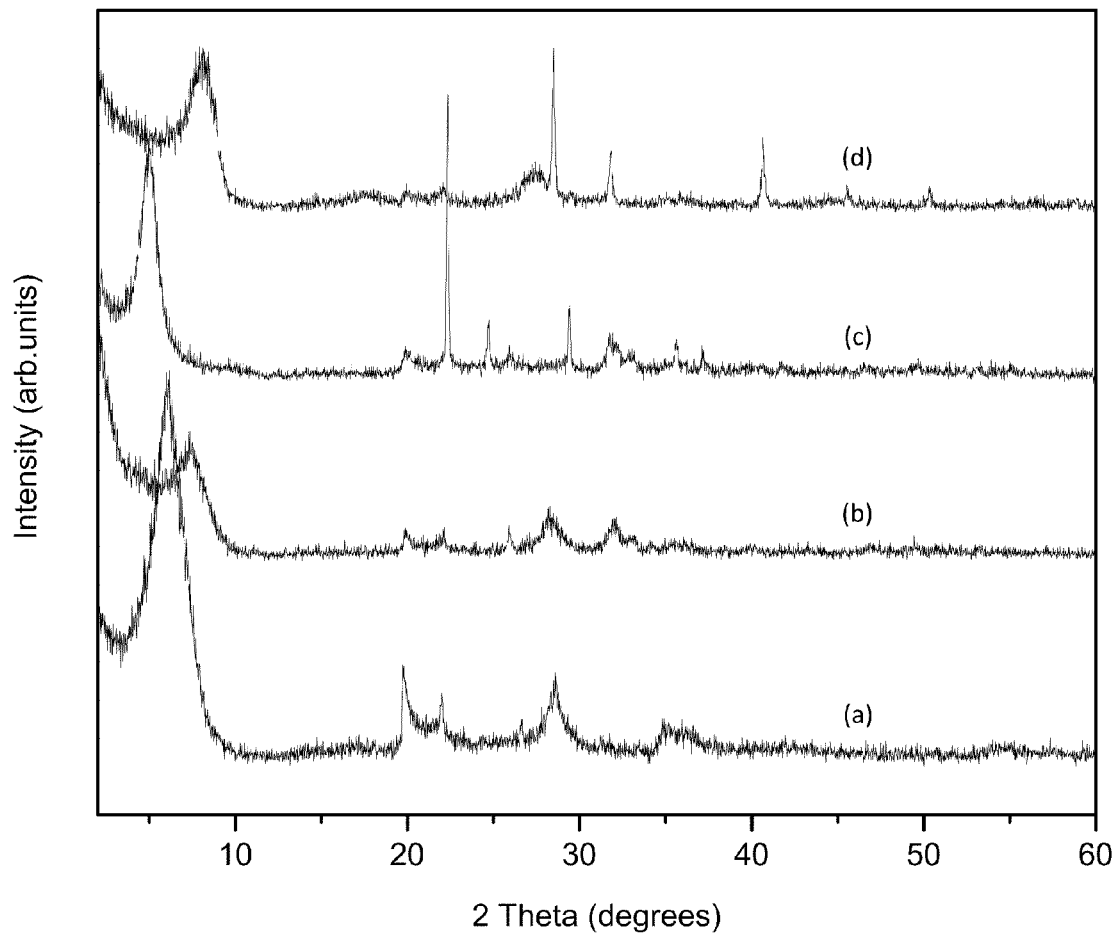
Figure 6: XRD patterns of (a) Na-MMT (b) HAP nanoparticles intercalated into MMT (c) urea adsorbed HAP nanoparticles intercalated into MMT (d) K intercalated into MMT

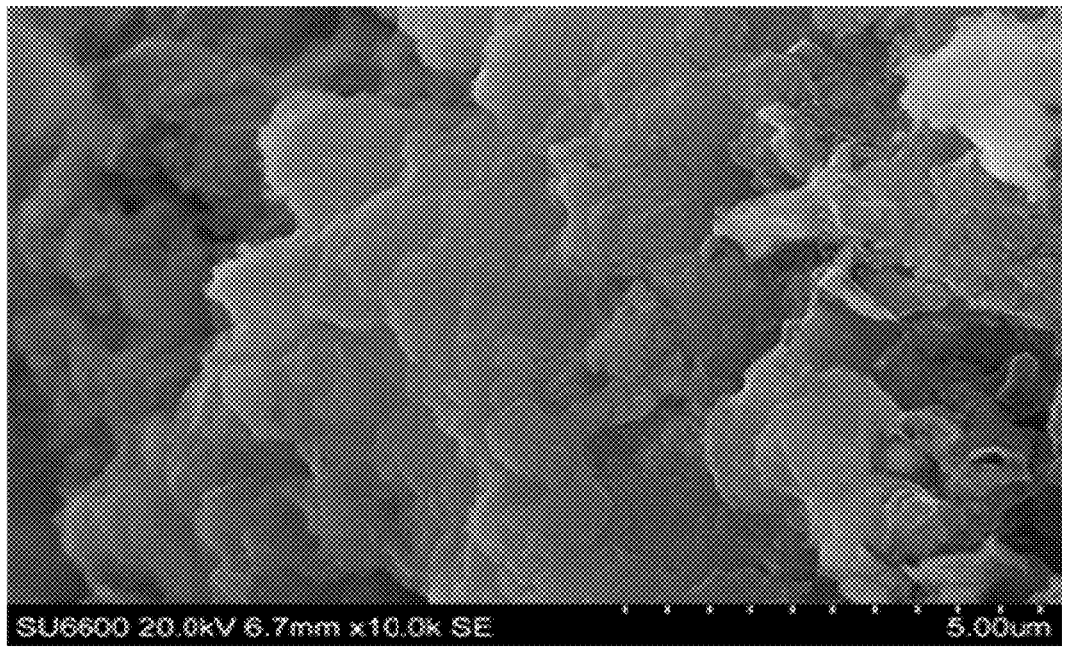
(a)
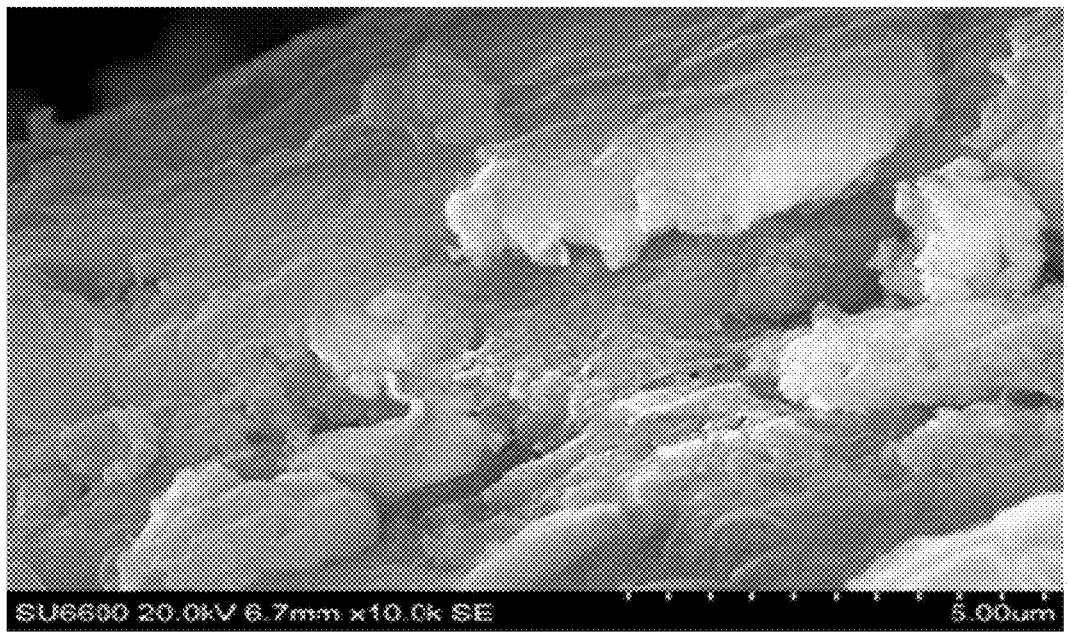
(b)
Figure 7: SEM images of (a) Na-MMT (b) urea adsorbed HAP nanoparticles

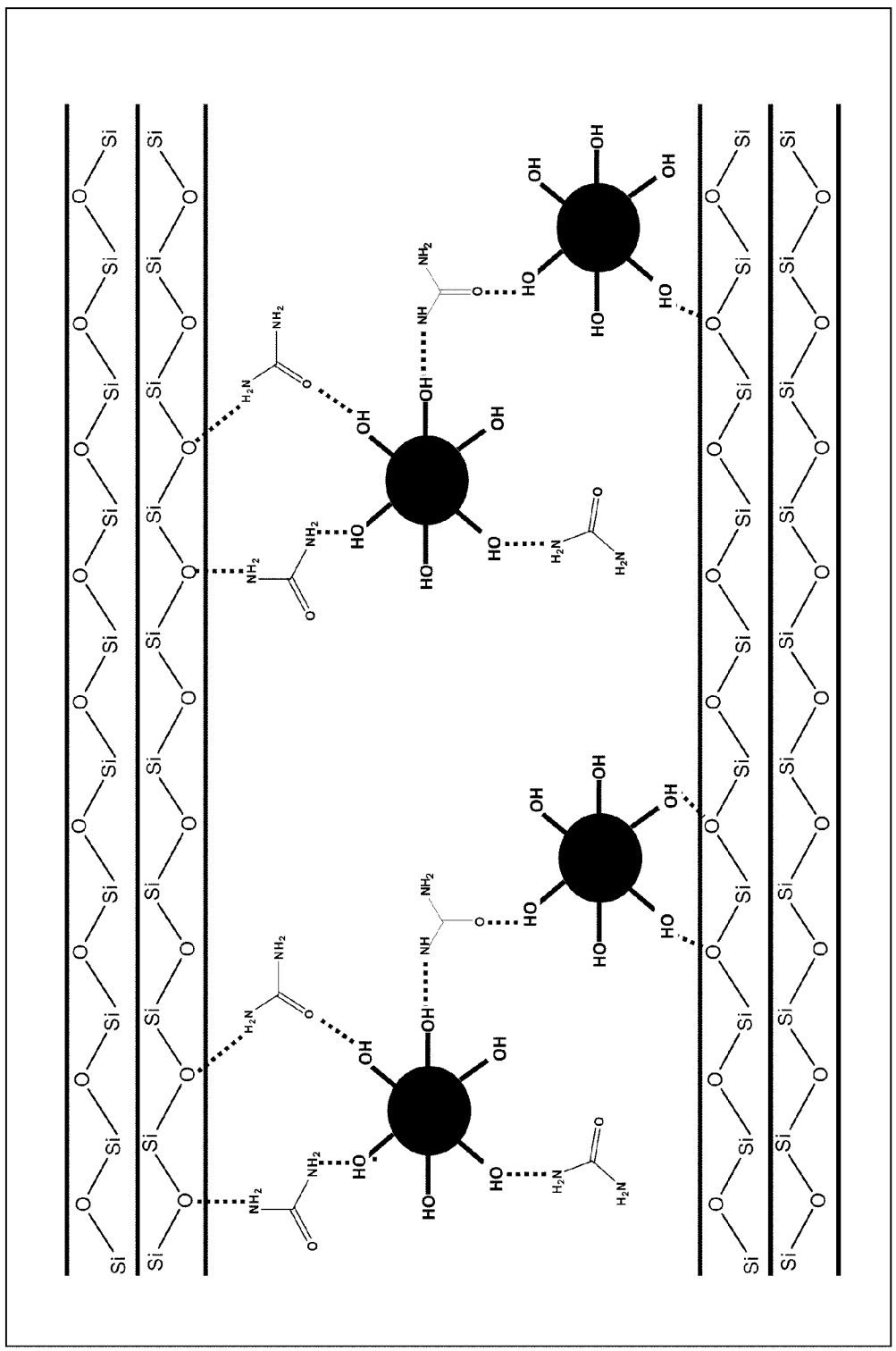
Figure 8: Schematic representation of the structure of the intercalated urea adsorbed HAP nanoparticles
(Figure is not drawn to the scale)

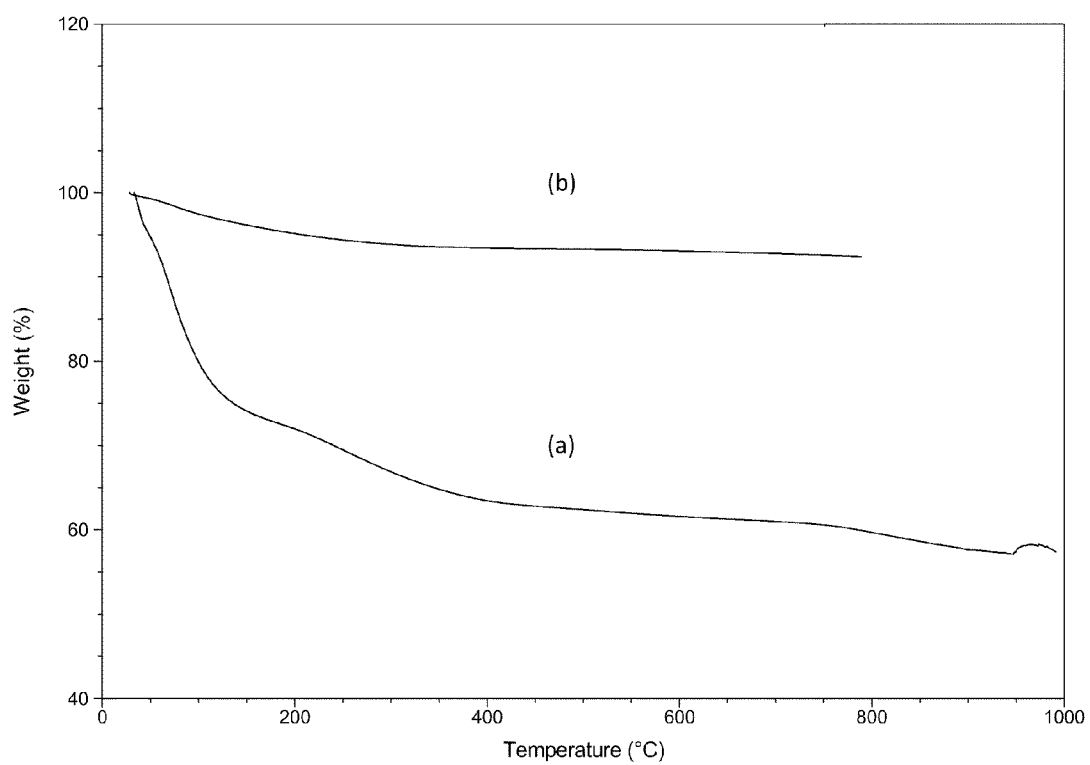
Figure 9: Thermograms of (a) synthesized HAP nanoparticles (b) urea adsorbed HAP nanoparticles

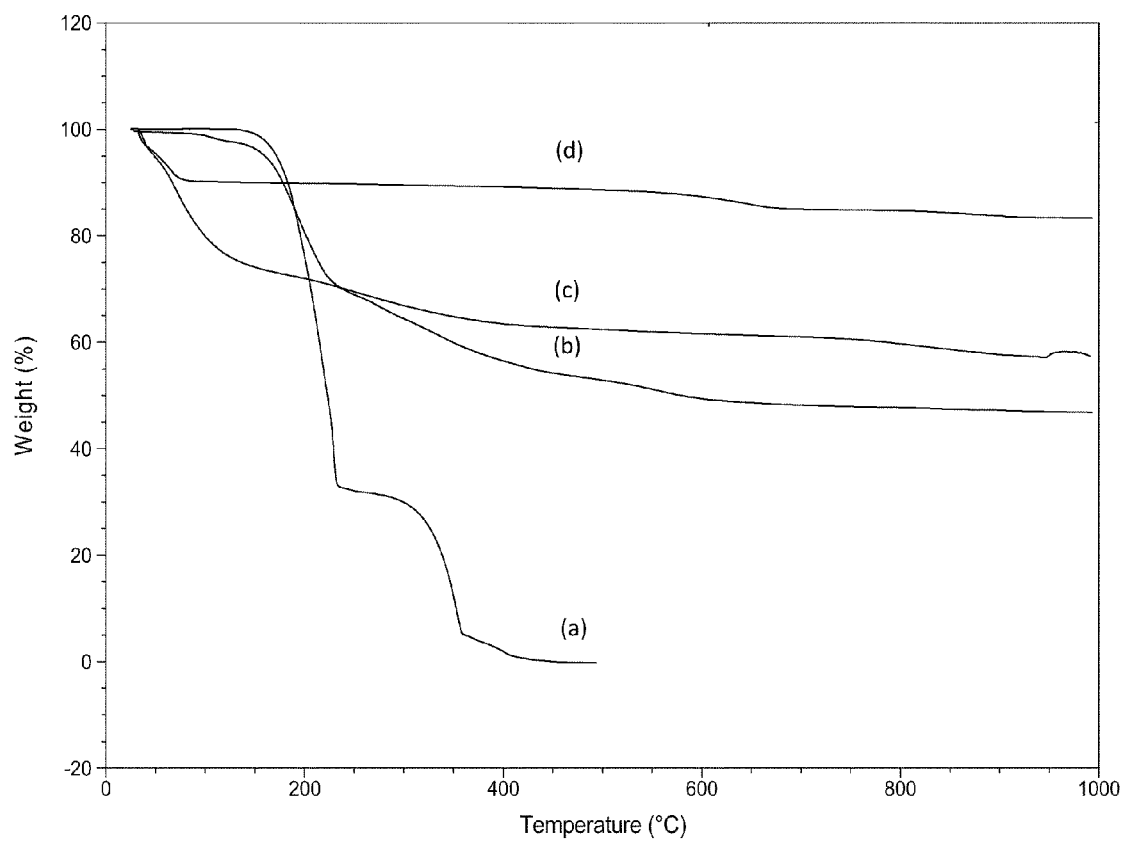
Figure 10: Thermograms of (a) urea (b) urea adsorbed HAP nanoparticles intercalated into Na- MMT (C) HAP nanoparticles (d) Na-MMT

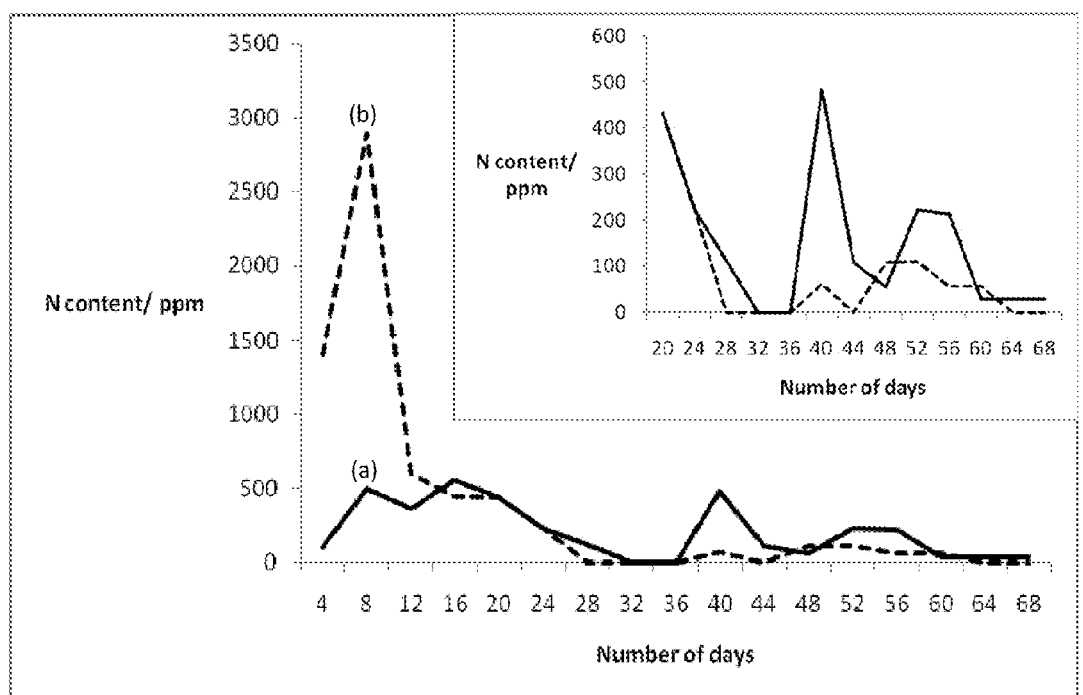
Figure 11: N release kinetics for soil from sandy soil found at sea level (a) urea adsorbed HAP nanoparticles intercalated MMT (b) commercial fertilizer containing NPK macronutrients; inset shows release behavior from day 20-68

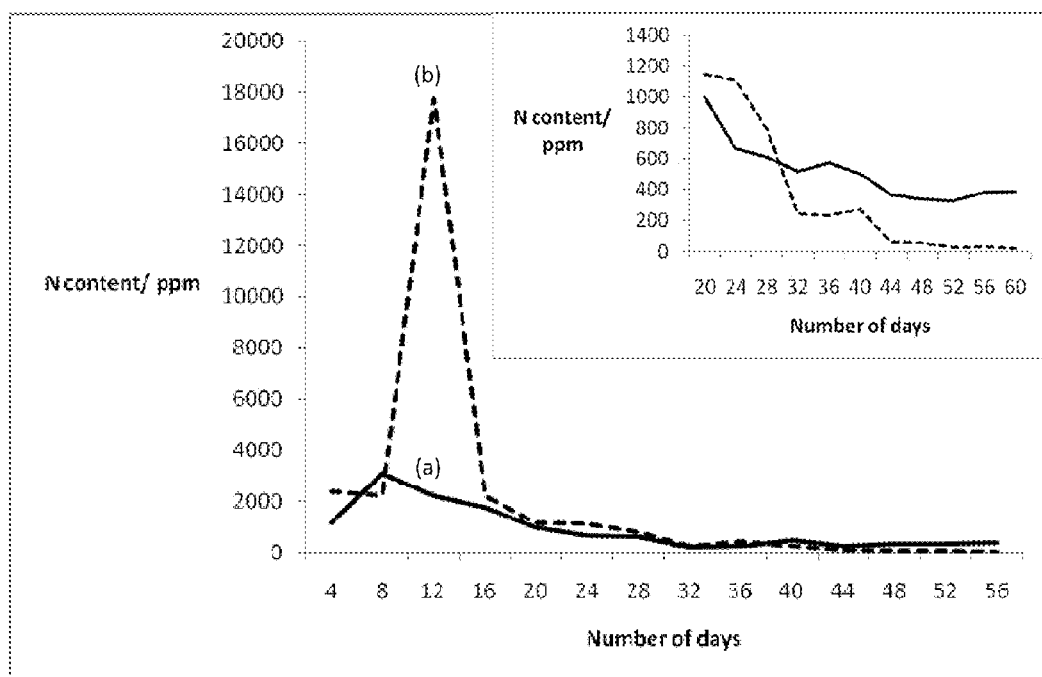
Figure 12: N release kinetics for soil found at an elevation of 1600 feet in a tea plantation (a) urea adsorbed HAP nanoparticles intercalated MMT (b) commercial fertilizer containing NPK macronutrients; inset shows release behavior from day 20-60

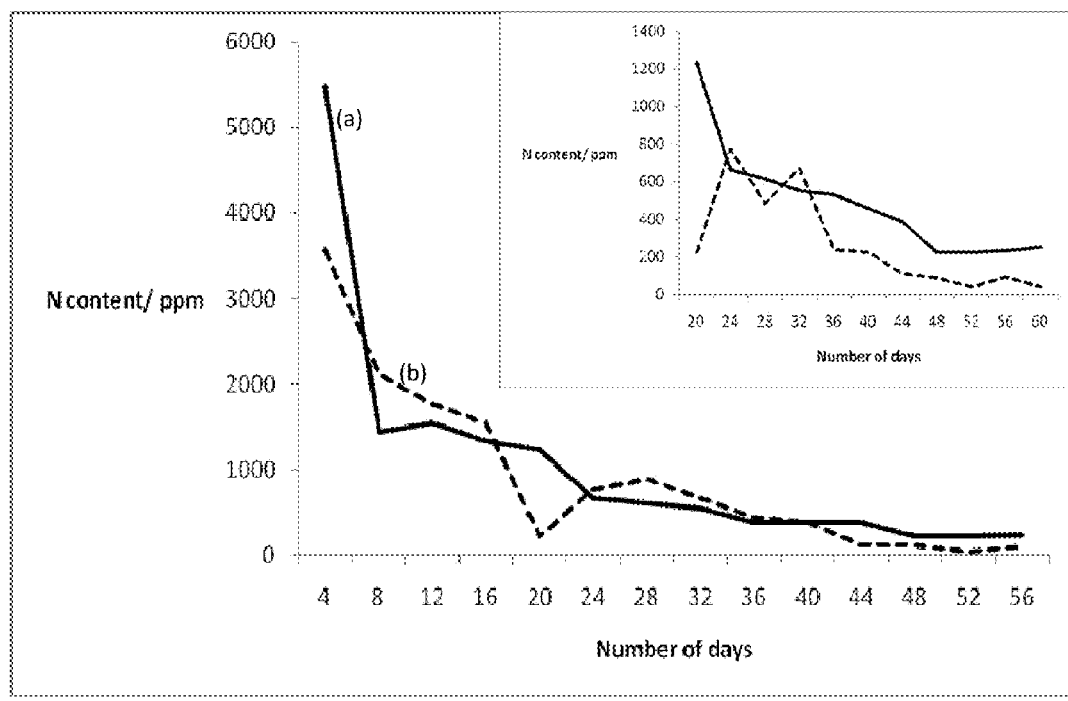
Figure 13: N release kinetics for soil found at an elevation of 4000 feet in a tea plantation (a) urea adsorbed HAP nanoparticles intercalated MMT (b) commercial fertilizer containing NPK macronutrients; inset shows release behavior from day 20-60

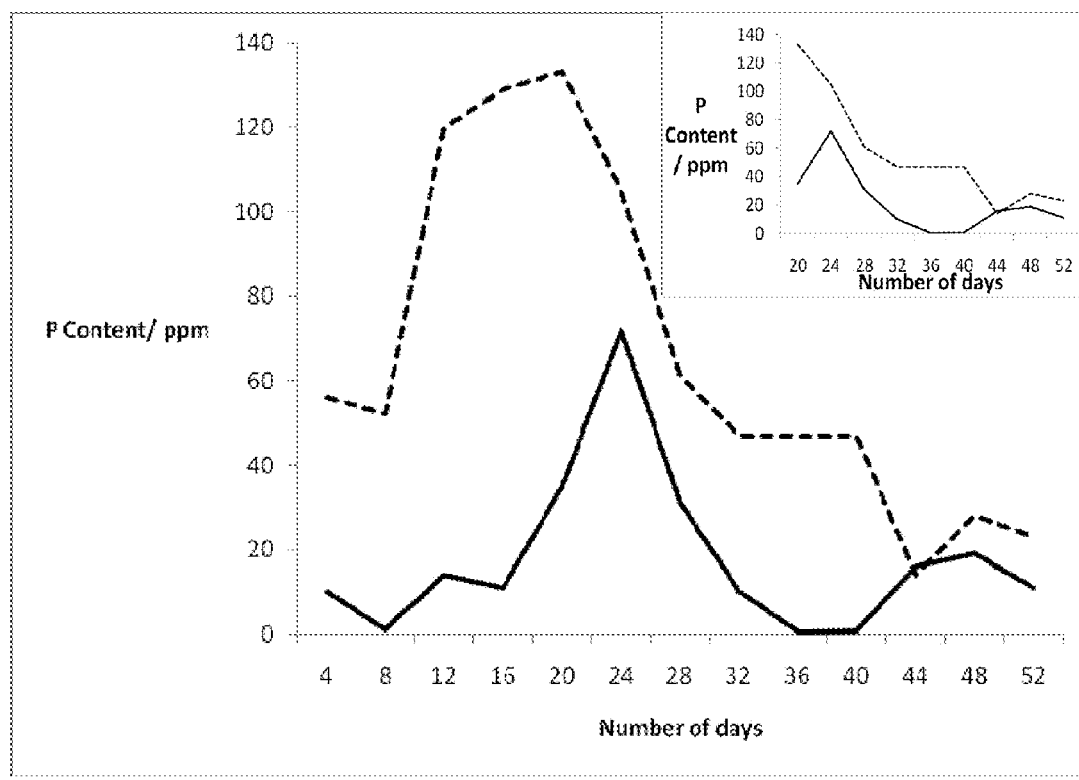
Figure 14: P release kinetics for soil from sandy soil found at sea level (a) urea adsorbed HAP nanoparticles intercalated MMT (b) commercial fertilizer containing NPK macronutrients; inset shows release behavior from day 20-52

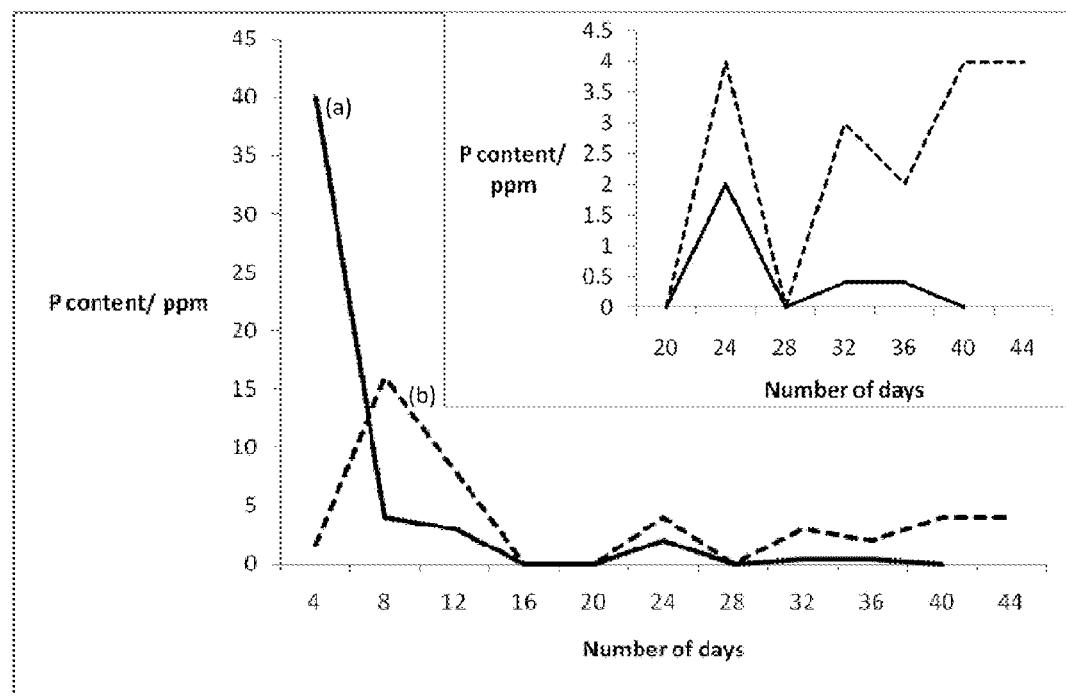
Figure 15: P release kinetics for soil found at an elevation of 1600 feet in a tea plantation (a) urea adsorbed HAP nanoparticles intercalated MMT (b) commercial fertilizer containing NPK macronutrients; inset shows release behavior from day 20-44

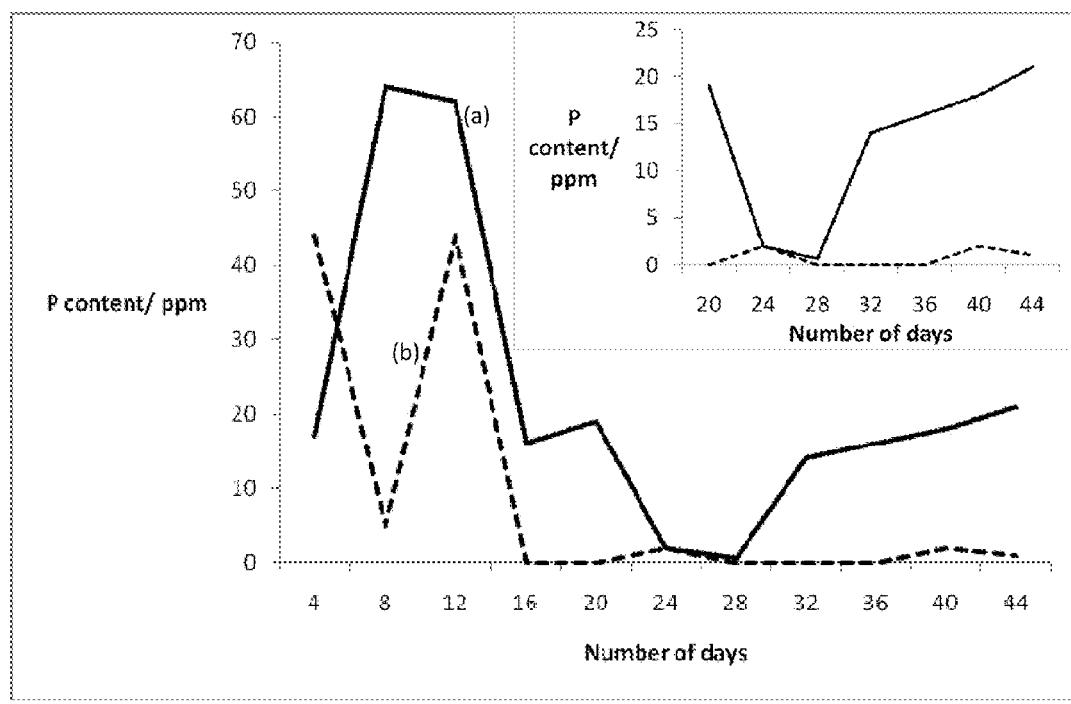
Figure 16: P release kinetics for soil found at an elevation of 4000 feet in a tea plantation (a) urea adsorbed HAP nanoparticles intercalated MMT (b) commercial fertilizer containing NPK macronutrients; inset shows release behavior from day 20-44

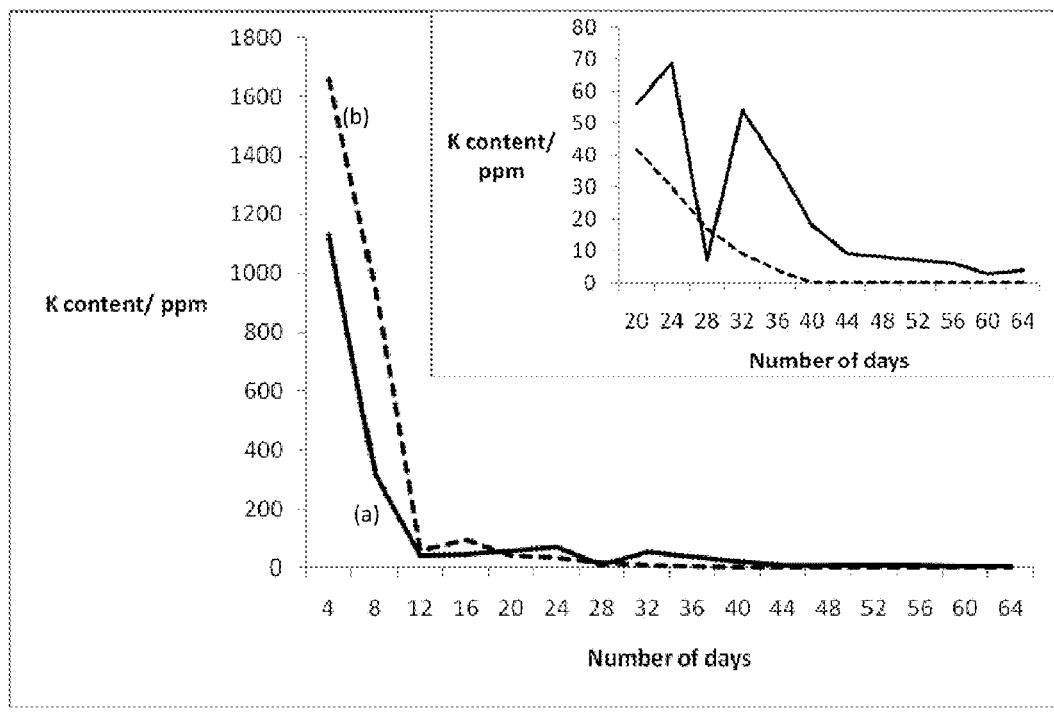
Figure 17: K release kinetics for soil from sandy soil found at sea level (a) urea adsorbed HAP nanoparticles intercalated MMT (b) commercial fertilizer containing NPK macronutrients; inset shows release behavior from day 20-64

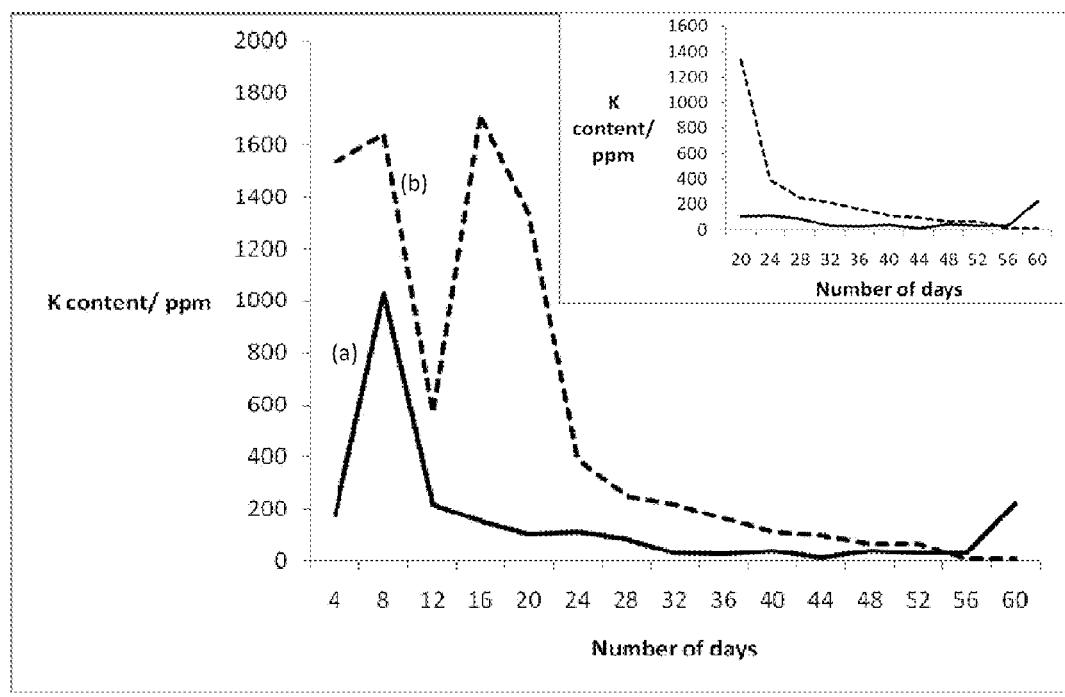
Figure 18: K release kinetics for soil found at an elevation of 1600 feet in a tea plantation (a) urea adsorbed HAP nanoparticles intercalated MMT (b) commercial fertilizer containing NPK macronutrients; inset shows release behavior from day 20-64

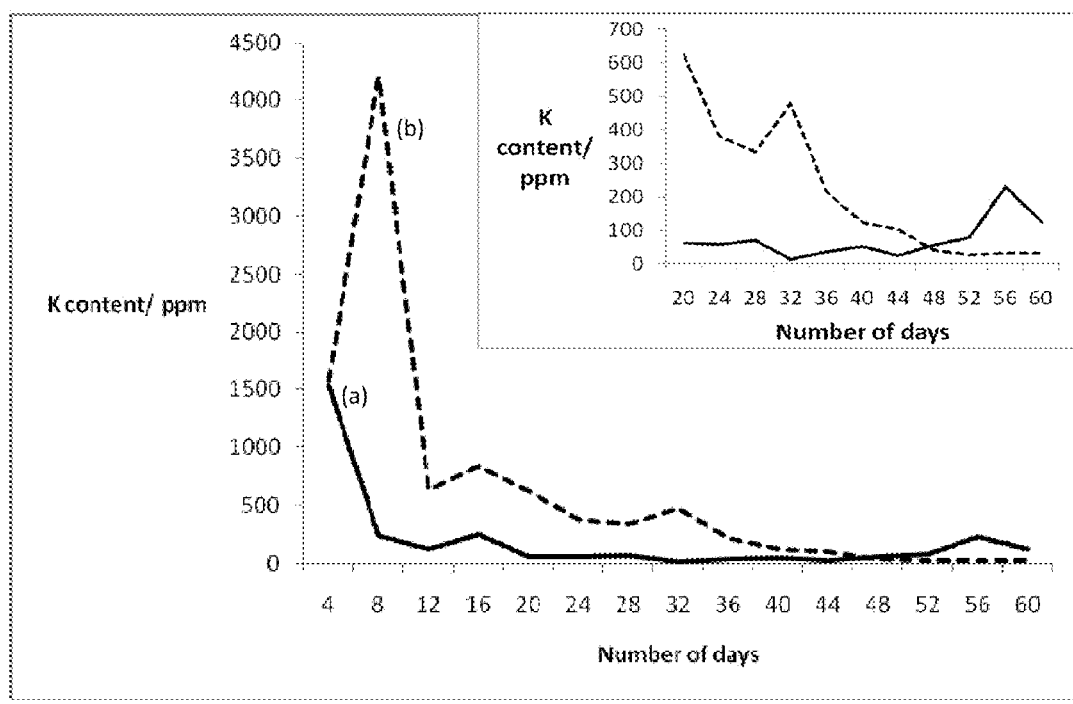
Figure 19: K release kinetics for soil found at an elevation of 4000 feet in a tea plantation (a) urea adsorbed HAP nanoparticles intercalated MMT (b) commercial fertilizer containing NPK macronutrients; inset shows release behavior from day 20-64

COMPOSITIONS FOR SUSTAINED RELEASE OF AGRICULTURAL MACRONUTRIENTS AND PROCESS THEREOF

FIELD

This invention relates to a composition and means of providing sustained release of agricultural nutrients. More particularly this invention relates to the preparation of a nanocomposite of intercalated nanoclay and urea adsorbed hydroxy apatite phosphate nanoparticles therein.

BACKGROUND

Nitrogen, phosphorus and potassium (NPK), which are required in large amounts for plants, are not adequately available in natural soils to support the sustained growth of plants. Therefore, these macronutrients (NPK) are needed to be applied externally through fertilizer. Water soluble conventional fertilizers typically result in a large amount of macronutrients being lost by leaching and evaporation. There is an increased interest in developing slow release fertilizers that release macronutrients to plants over time. Advantages of slow release fertilizers are improved efficiency and quality as the fertilizer is released over time thus providing sufficient quantities of macronutrients as required for higher crop yields. In addition, slow release fertilizers result in reduced environmental damage from leaching of macronutrients into water and emissions as gasses, compared to conventional water soluble fertilizers.

Macronutrients in fertilizers can be applied to the soil as a solid in the form of a powder or pellets or as a spray. The uptake of macronutrients by the plant needs to be compensated by their external application to the soil periodically. Nitrogen is a key macronutrient source in agriculture particularly for economic crops such as tea. Large amount of fertilizer is applied to the soil of the tea plant to improve the quality and the yield of the leaves produced. For example, a study in Japan (Yamada et al., Journal of Water and Environmental Technology, 7, 4, 331-340, 2009) reported that of the large amount of nitrogen fertilizer applied to tea, only 12% of the nitrogen input was taken up by the plant and the rest discharged to the environment. Therefore, one of the unsolved problems of fertilizer application is, in relation to the amounts of nitrogen applied to soil, the low Nitrogen Use Efficiency (NUE) by crops. This is because an excessive amount of nitrogen, up to 70%, is lost in conventional fertilizers due to leaching, emissions, and long-term incorporation by soil microorganisms. As such, supplying nitrogen macronutrient is critical in preventing the decline of productivity and profitability due to degradation and aging of tea plants (Kamau et al., Field Crops Research 1, 108, 60-70, 2008). Attempts to increase the NUE have so far has met with little success.

U.S. Pat. No. 6,261,997 B1 to Rubin et al., discloses slow release of pesticides adsorbed on organically modified clay to prevent leaching in underground and surface water. U.S. Pat. No. 4,219,349 to Bardsley, discloses compositions of calcined clay granules and solution or suspension containing micronutrients (Fe, Zn, Mn, Cu, B, Mo, Cl and S). U.S. Pat. No. 4,849,006 to Milburn et al., discloses a controlled release composition comprising of an organic, biologically active material absorbed on an organically modified clay. U.S. Pat. No. 6,821,928 B2 to Ruskin, discloses a method to reduce the rate of diffusion of slow release materials through polymers and a process for making drip irrigation devices with long term control of root growth. It further, discloses bioactive material such as herbicide that is intercalated into nanoclays to protect against root intrusion in drip irrigation applications. U.S. Pat. No. 3,902,886 to Banin et al., discloses clay attached micronutrients to provide micronutrients to plants. US2009/0169524 A1 to Kalpana et al., discloses biopolymer based nanocomposites of chitosan, montmorillonite (MMT) and hydroxyl apatite for bone growth in medical applications.

Solutions are needed to provide slow release macronutrient formulations for plant growth applications.

SUMMARY

Accordingly provided herein is a plant fertilizer nanocomposite that contains two nanosystems. Also disclosed herein is a process for the preparation of a nanocomposite that contains nitrogen containing macronutrient compounds such as urea. The nitrogen containing macronutrient compound is adsorbed onto the surface of hydroxy apatite phosphate (HAP) nanoparticles. Adsorbed nitrogen containing macronutrient compound forms a complex with HAP nanoparticles. This complex is intercalated within the interlayers of a nanoclay and forms a nanocomposite. It is believed that the nitrogen containing macronutrients adsorbed HAP nanoparticles are intercalated within the layers of the nanoclay such as montmorillonite (MMT) by adsorption onto its surface active hydroxyl groups. In addition to intercalation within the interlayers, some of the macronutrient adsorbed HAP nanoparticles are adsorbed onto the surfaces and edges of the nanoclay. The nanocomposite prepared by this process when applied to aqueous and terrestrial environments releases the macronutrient compound in a slow and sustained manner. The nanocomposite acts as a reservoir for slow and sustained release of nitrogen macronutrient through the soil medium. The soil medium acts as a conduit for providing the pH for release and transport of the macronutrients such as urea to the roots of the plant.

DESCRIPTION OF FIGURES

FIG. 1: XRD pattern of synthesized HAP nanoparticles

FIG. 2: SEM image of synthesized HAP nanoparticles

FIG. 3: XRD pattern of the urea adsorbed HAP nanoparticles

FIG. 4: SEM image of urea adsorbed HAP nanoparticles

FIG. 5: Schematic representation of the structure of the urea adsorbed HAP nanoparticles FIG. 6: XRD patterns of (a) MMT (b) HAP nanoparticles intercalated into MMT (c) urea adsorbed HAP nanoparticles intercalated into MMT (d) K intercalated into MMT FIG. 7: SEM images of (a) MMT (b) urea adsorbed HAP nanoparticles intercalated MMT FIG. 8: Schematic representation of the structure of the intercalated urea adsorbed HAP nanoparticles FIG. 9: Thermograms of (a) synthesized HAP nanoparticles (b) urea adsorbed HAP nanoparticles FIG. 10: Thermograms of (a) urea (b) urea adsorbed HAP nanoparticles intercalated into MMT (c) HAP nanoparticles (d) MMT FIG. 11: N release kinetics for soil from sandy soil found at sea level (a) urea adsorbed HAP nanoparticles intercalated MMT (b) commercial fertilizer containing NPK macronutrients FIG. 12: N release kinetics for soil found at an elevation of 1600 feet in a tea plantation (a) urea adsorbed HAP nanoparticles intercalated MMT (b) commercial fertilizer containing NPK macronutrients FIG. 13: N release kinetics for soil found at an elevation of 4000 feet in a tea plantation (a) urea adsorbed HAP nanoparticles intercalated MMT (b) commercial fertilizer containing NPK macronutrients FIG. 14: P release kinetics for soil from sandy soil found at sea level (a) urea adsorbed HAP nanoparticles intercalated MMT (b) commercial fertilizer containing NPK macronutrients FIG. 15: P release kinetics for soil found at an elevation of 1600 feet in a tea plantation (a) urea adsorbed HAP nanoparticles intercalated MMT (b) commercial fertilizer containing NPK macronutrients FIG. 16: P release kinetics for soil found at an elevation of 4000 feet in a tea plantation (a) urea adsorbed HAP nanoparticles intercalated MMT (b) commercial fertilizer containing NPK macronutrients FIG. 17: K release kinetics for soil from sandy soil found at sea level (a) urea adsorbed HAP nanoparticles intercalated MMT (b) commercial fertilizer containing NPK macronutrients FIG. 18: K release kinetics for soil found at an elevation of 1600 feet in a tea plantation (a) urea adsorbed HAP nanoparticles intercalated MMT (b) commercial fertilizer containing NPK macronutrients FIG. 19: K release kinetics for soil found at an elevation of 4000 feet in a tea plantation (a) urea adsorbed HAP nanoparticles intercalated MMT (b) commercial fertilizer containing NPK macronutrients

DETAILED DESCRIPTION

Commercial fertilizers contain macronutrients and micronutrients that are essential for plant growth and macronutrients are used by plants in relatively large amounts.

As defined herein primary macronutrients are nitrogen (N), phosphorous (P), and potassium (K) while calcium (Ca), magnesium (Mg), and sulfur (S) are secondary macronutrients. All six nutrients are important for plant growth.

As defined herein, micronutrients required in small amounts for plant growth are boron (B), chlorine (Cl), manganese (Mn), iron (Fe), zinc (Zn), copper (Cu), molybdenum (Mo) and selenium (Se).

As defined herein sustained release of macronutrient is release in a constant and continual manner.

As defined herein the slow release of macronutrient provides the plant with nutrients gradually over an extended period of time. Soils applied with slow release fertilizer that contain macronutrients will require less applications of such fertilizer and leads to higher efficiency of macronutrient release compared to conventional fast release fertilizers.

As defined herein the intercalating agent is a nanosystem that is held within the interlayers of the nanoclay. Nanoclay can include layered materials which comprise (a) layered silicates and (b) layered double hydroxides. In an embodiment the nanoclay is MMT.

Adsorption as defined herein refers to any means that forms a complex between the nanoclay and the macronutrient nanoparticles; and nitrogen containing macronutrient compound and the HAP nanoparticles. These include covalent bonds, electrostatic bonds, Van der Waals bonds, hydrogen bonds.

As defined herein the nanocomposite comprises two nanosytems comprising nitrogen containing macronutrient adsorbed HAP nanoparticles that are intercalated between the interlayers of nanoclay.

(a) Layered Silicates

The intercalated layered silicates comprise of silicate layers. The layered silicate may be synthetically derived or naturally occurring. Exemplary layered silicates include, 1. Natural clays such as smectic clays for example, bentonite clays (e.g., montmorillonite, hectorite), mica, vermiculite, nontronite, beidellite, volkonskotite, and saponite;
2. Layered polysilicates (e.g., layered silicic acid), such as kanemite, makatite, ilerite, octosilicate, magadiite and kenyaite; and
3. Synthetic clays, such as, synthetic silicates, synthetic mica, synthetic saponite, synthetic laponite and synthetic hectorite.

The layered silicate comprises a plurality of silicate layers, that is a laminar structure having a plurality of stacked silicate sheets or layers between the layers. For example, the layered silicate may have 2:1 layer structure typified by an octahedral layer comprising aluminum or magnesium, sandwiched between two tetrahedral silicate layers.

The average interlayer spacing of a layered silicate refers to spacing where the intercalation takes place. The average interlayer spacing including the layer thickness before intercalation is about 14.5 Å. The intercalated layer spacing of a layered silicate (including an intercalated layered silicate) refers to the distance between the internal faces of the non-exfoliated adjacent layers of representative samples of the layered silicate. The interlayer spacing may be calculated using the standard powder X-Ray Diffraction (XRD) using Bragg's law equation known in the art. The interlayer spacing varies according to the size of intercalating agent and the number of surrounding water spheres.

Useful layered silicates are available from various companies including Rheox, Southern Clay Products Inc., Texas, USA. Deposits of layered silicates such as MMT are available in Murrunkan, Sri Lanka and Nevada, USA.

(b) Layered Double Hydroxides

Layered double hydroxides (LDHs), also known as anionic clays or hydrotalcite-like materials, consist of stacks of positively charged hydroxide layers and interlayer charge balancing anions. The structure of the LDHs can be described by considering the structure of brucite [$Mg(OH)_2$], in which the $Mg^{2+}$ ions are octahedrally coordinated to hydroxyl groups. The octahedral units share the edges to form infinite, neutral layers, which stack upon one another leading to a layered network held through hydrogen bonding. In an LDH, some of the divalent ions are isomophously substituted by higher valent ions of comparable size generating a positive charge on the layers. The positive charge on the layers, therefore, requires interlayer charge-balancing anions in order to maintain the total charge neutrality. LDHs may be represented by the general formula: $M^{2+}_{1-x}M^{3+}_{x}(OH)_2 A^{n-}_{x/n} \cdot mH_2O$, where $M^{2+}$ and $M^{3+}$ are divalent and trivalent cations, respectively.

X is $M^{3+}/(M^{3+}+M^{2+})$, and A is the interlayer charge balancing anion of valence n.

The presence of strong H-bonding network within the layers additionally facilitates the insertion of other neutral molecules with electro negative functional groups.

LDHs are available as naturally occurring (hydrotalcite, brucite) and as synthetic minerals.

Intercalating Agent

The nanocomposite comprises of an intercalating agent adsorbed between the layers of the nanoclay. The intercalating agent that is used in the present invention is the urea adsorbed HAP nanoparticles. The cations present within the interlayers of the nanoclay comprise H, Na or Ca. In an embodiment, Na-MMT, a smectic clay is used as the nanoclay for the intercalation. In another embodiment, some of the intercalating agent can be present at the outer surfaces and edges of the layers of MMT which is a layered silicate. In an embodiment the nanoclay is MMT found in Murrunkan, North-western part of Sri Lanka.

Suitable HAP adsorbed intercalating agents can include urea, thiourea, amides, polyamines and alginates. A person skilled in the art may recognize that further modifications leading different variations in the above molecules could be used as intercalating agents. Any other nitrogen containing substance which can deliver nitrate or nitrite to the plant can be used as the macronutrient.

Manufacture of Nanocomposites

Nanocomposites are prepared by intercalation of the nitrogen containing macronutrient compound adsorbed onto the surface of HAP nanoparticles. HAP nanoparticles can be chemically synthesized using calcium hydroxide suspension and phosphoric acid (Mateus et al., Key Engineering Materials, 330-332, 243-246, 2007). Adsorption of nitrogen containing macronutrient compounds such as urea can be facilitated by stirring the HAP nanoparticles in a concentrated urea solution. Other nitrogen containing macronutrient compounds can also be used for adsorption onto the HAP nanoparticles. Such adsorbed nitrogen containing macronutrient compounds can be intercalated within the interlayers of the nanoclay.

Alternatively, HAP nanoparticles can be prepared using natural apatite. Suitable natural apatite can be obtained from Eppawala, Sri Lanka. This natural apatite can be subjected to wet grinding using a nanogrinder (Fritsch, Pulverisette 7, Germany) to produce HAP nanoparticles. In an embodiment 2.5 g of natural apatite in 25 ml of 4 M urea is subjected to grinding at 1000 rpm for one or more hours using tungsten carbide and zirconium oxide grinding spheres having a diameter ranging from 0.5 mm to 5 mm. In addition, grinding can be done in the presence of bio compatible surface modifiers such as cellulose, alginate and poly-ols. Further grinding can be used to obtain HAP nanoparticles of the desired size suitable for intercalation.

HAP nanoparticles can be intercalated within the interlayers of the nanoclay by dispersing macronutrient adsorbed HAP nanoparticles in an aqueous suspension of nanoclay. Mechanical agitation or ultrasound sonication can be used to facilitate intercalation. Suitable nanoclays for intercalation includes and is not limited to $M^{n+}$-MMT (M=Na, K, Ca, Zn, Mg, H) and LDHs. The intercalation may be enhanced using ultrasonic, thermal and microwave radiation. The inclusion of the intercalating agent within the nanolayers of the nanoclay can increase the distance between the layers. In a preferred embodiment, the intercalating agent is held without increasing the interlayer distance of the nanoclay. Such an intercalation can provide the tightness required for slow and sustained release.

In certain embodiments, the MMT interlayer distance is 1.52 nm; and intercalation of HAP nanoparticles can reduce the interlayer distance suggesting strong interaction between the HAP nanoparticles and the interlayers of the nanoclay. Further, the nanoparticles may displace the water spheres within the interlayer. In certain embodiments the intercalation of macronutrients adsorbed HAP nanoparticles expanded the layers resulting in an interlayer spacing of 1.73 nm. The absence of peaks due to HAP nanoparticles or urea in the X-ray diffraction (XRD) pattern of the macronutrients adsorbed HAP nanoparticles intercalated MMT suggests the presence of a nanocomposite system rather than three individual crystalline phases.

In an embodiment, the presence of two nanosystems in the nanocomposite results in the adsorbed macronutrients being released in a slow and sustained manner. In an embodiment some nitrogen containing macronutrient adsorbed HAP nanoparticles which are not intercalated can be adsorbed onto the edges and the surfaces of the MMT. These nitrogen containing macronutrient adsorbed HAP nanoparticles can be released to the soil earlier than the intercalated nitrogen containing macronutrient adsorbed HAP nanoparticles. Such a duality in adsoption of nitrogen containing macronutrient compounds on HAP nanoparticles may aid slow release of the macronutrient compound into the soil.

As described herein the adsorption interactions between macronutrient adsorbed HAP nanoparticles and MMT can be studied by Fourier Transform Infra Red Spectroscopy (FTIR). The HAP phase distribution and particle size can be investigated using Atomic Force Microscopy (AFM). The particle size and the morphology of the HAP nanoparticles, macronutrients adsorbed HAP nanoparticles, MMT and macronutrients adsorbed HAP nanoparticles intercalated MMT can be studied using Scanning Electron Microscopy (SEM). The thermal behavior of macronutrients adsorbed HAP nanoparticles and MMT can be studied by Thermogravimetry Analysis (TGA). The release behavior in soil was investigated by NPK elemental analysis carried out over a period of 12 weeks. Kjeldhal method (N), Vanadomolybdate method (P) and flame photometry (K) was used.

According to SEM imaging, macronutrient adsorbed HAP nanoparticles displayed rod-like morphology similar to the HAP nanoparticles prior to adsorption. SEM imaging indicted particle size of less than 30 nm for macronutrient adsorbed HAP nanoparticles. Nanocomposites studied using FTIR indicated that urea is attached to the hydroxyl groups of the HAP nanoparticles, and is further immobilized when complexed with the hydroxyl groups of MMT during intercalation.

Release Behavior in Soils

As a person skilled in the art may recognize the pH of the soils play an important role in the release behavior the macronutrients from the nanocomposite to the soil. Further, soil pH is important in the growth of economic plants (Tea and Rubber) and ornamental plants (Ferns and Orchids). This is particularly pertinent for plant growth of economic plants such as tea. The clay nanocomposite structure and the soil pH govern the release behavior of the macronutrient. At acidic pH values, the nanocomposite in contact with the soil releases the adsorbed macronutrient. It is believed that, while not bound by theory, protonation of the macronutrient adsorbed HAP nanoparticles leads to the release of the adsorbed macronutrient. Here, urea due to its basicity can be readily protonated and aid the release process. In addition, macronutrient adsorbed HAP nanoparticles may be released as a whole. Soils having acidic pH values in the range between about 3.5 to 6 are preferred. Generally, tea plants thrive in acidic soils in the pH range between about 4.2 to 5.7.

In an embodiment, the nanocomposite disclosed herein can be used for supplying macronutrients for tea plants. This is needed because in the production of 1000 kg of tea leaves (dry weight) removes up to 100 kg of nitrogen from soil which has to be replenished by external application of fertilizer. Additionally this nanocomposite can deliver the secondary macronutrient calcium. This is important since acidic tea soils are low in calcium. Further, the nanocomposite can comprise potassium intercalated MMT leading to its release in a slow and sustained manner in acidic soils.

In certain embodiments a uniform release of nitrogen over a period up to 3 months is observed. During fertilizing of tea plants, the frequency of application can be attenuated depending on the fertilizer requirement of a given tea plantation. This can be done by starting a second round of application at a suitable period prior to reaching the end of the first application of the macronutrient adsorbed HAP nanocomposite. In another embodiment soil found at about 4000 feet in tea plantations, for example from Thalawakelai, Sri Lanka, can be used for slow and sustained release of the nitrogen containing macronutrient. In another embodiment soil found at about 1600 feet in tea plantations, for example from Kandy, Sri Lanka, can be used for slow and sustained release of the nitrogen containing macronutrient. Organic matter content of soil between 1600 to 4000 feet elevation can range from 2 to 3%. In general, higher elevations contain more organic matter compared to lower elevations such as sea level. Such high organic matter could lead to lowering of pH of the soil. However, in sandy soils found at sea level, for example in Colombo, Sri Lanka, where the organic content is lower than 2%, the slow and sustained release may not be achieved as the pH of the soil is about 7.

In an embodiment, low phosphorous release behavior indicates that P may be released slower than the depletion of nitrogen. This may be the result of HAP nanoparticles being held tightly within the nanoclay interlayer spacing. Generally, tightly held intercalated materials such as HAP nanoparticles are released subsequent to the less tightly held intercalated materials such as macronutrient compounds adsorbed onto HAP nanoparticles. However, available P in the nanocomposite may be eventually released over a longer period of time.

EXAMPLES

Example 1

Preparation of Hap Nanoparticles

HAP nanoparticles were synthesized by drop wise addition of phosphoric acid (250 ml of 0.6 M) into a suspension of calcium hydroxide (19.29 g/250 ml). The reaction was carried out under mechanical stirring (1000 rpm). The reaction takes place according to the following equation.

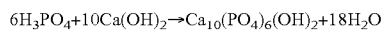

$$6H_3PO_4 + 10Ca(OH)_2 \rightarrow Ca_{10}(PO_4)_6(OH)_2 + 18H_2O$$

HAP nanoparticles synthesized as described above were allowed to settle and the supernatant was decanted. This process was repeated three times using distilled water to purify the product. The solid obtained was dried at 100° C. for two hours to provide 25 g of HAP nanoparticles which were characterized using XRD, SEM/EDX, AFM and FTIR.

As seen from FIG. 1, the XRD pattern indicated that the synthesized HAP nanoparticles were identical to a commercial sample obtained from Sigma Aldrich Chemical Company, USA. No other peaks were observed confirming the absence of any other crystalline impurities. As evidenced by EDX spectra, the presence of Ca and P was confirmed. As seen from FIG. 2, SEM images of HAP nanoparticles, exhibited needle like morphology with a diameter less than 30 nm. AFM images corroborated the uniform particle size. The particle size distribution was also confirmed by the particle size measurements done using a Malvern, nanoZS, ZEN 3600.

FTIR spectrum further confirmed the presence of HAP nanoparticles and the peak assignments are given in Table 1 below:

TABLE 1

| FTIR peak assignments for HAP nanoparticles | |
|---|---|
| Wavenumber/cm$^{-1}$ | Peak assignment |
| 1080-1020 | P—O stretching of $PO_4^{3-}$ |
| 3600-3580, 633 | O—H stretching |
| 1640 | O—H bending of adsorbed water |

Example 2

Synthesis of urea adsorbed HAP nanoparticles

HAP nanoparticles synthesized as described in Example 1 were treated with 250 ml of 1 M urea solution. The solution was stirred mechanically at 750 rpm for 12 hours. In another experiment the solution was subjected to ultrasonic mixing at 30 kHz for 45 minutes. The excess liquid was decanted and the product was washed to remove the excess urea.

The product was characterized using XRD, SEM/EDX and FTIR. As seen in FIG. 3, XRD pattern of the urea adsorbed HAP nanoparticles indicated the presence of peaks due to HAP, and an extra peak that was attributed to the adsorbed urea.

FIG. 4 represents the SEM image of urea adsorbed HAP nanoparticles; the particle size and the morphology of the HAP nanoparticles were not significantly changed by surface adsorption of urea.

Table 2 represents FTIR data obtained for urea, HAP nanoparticles and urea adsorbed HAP nanoparticles.

TABLE 2

| FTIR peak assignment for urea, HAP nanoparticles and urea adsorbed HAP nanoparticles. | | | | | |
|---|---|---|---|---|---|
| Wavenumber/cm$^{-1}$ | Urea | Wavenumber/cm$^{-1}$ | HAP nanoparticles | Wavenumber/cm$^{-1}$ | Urea adsorbed HAP nanoparticles |
| 3430, 3340 doublet | N—H stretching | | | ~3300 broad | N—H/O—H stretching |
| 1680 | carbonyl stretching | | | 1666 | carbonyl stretching |
| 1590 | N—H bending | | | 1627 | N—H bending |
| 1460 | N—C—N stretching | | | 1446 | N—C—N stretching |
| | | 1030 | P—O stretching of $PO_4^{3-}$ | 1030 | P—O stretching of $PO_4^{3-}$ |
| | | 3500, 633 | O—H stretching | 3300 broad | O—H stretching |

TABLE 2-continued

FTIR peak assignment for urea, HAP nanoparticles and urea adsorbed HAP nanoparticles.

| Wavenumber/ cm$^{-1}$ | Urea | Wavenumber/ cm$^{-1}$ | HAP nanoparticles | Wavenumber/ cm$^{-1}$ | Urea adsorbed HAP nanoparticles |
|---|---|---|---|---|---|
| | | 3350-3550 | adsorbed or bound water | 3350-3550 | adsorbed or bound water |
| | | 1640 | O—H bending | 1627 | O—H bending |

As seen from Table 2, N—H stretching frequency of pure urea appears as a doublet at 3430 cm$^{-1}$ and 3340 cm$^{-1}$ and once urea is bonded to HAP nanoparticles it gives rise to a noticeable shift to 3300 cm$^{-1}$. This shift reveals that the NH$_2$ groups of urea are bonded to OH groups of HAP nanoparticles via H-bonding. This can be confirmed further by the peak broadening in the corresponding N—H stretching frequencies of urea. The band at 1590 cm$^{-1}$ for the N—H bending motion was still present although shifted to 1627 cm$^{-1}$ for urea adsorbed HAP nanoparticles. This indicates the presence of free unbound NH$_2$ groups even after adsorption of urea onto the HAP nanoparticles. These free NH$_2$ groups may be held within the intercalated structure and may be released at the early stages during fertilization.

The carbonyl stretching frequency of pure urea appears at 1680 cm$^{-1}$ while the corresponding peak for urea adsorbed HAP nanoparticles is at 1666 cm$^{-1}$. There is a clear shift in stretching frequency of the carbonyl group for urea adsorbed HAP nanoparticles indicating that urea is bonded to HAP nanoparticles through the carbonyl group. This can be further confirmed by a noticeable peak shift of the N—C—N stretching frequency (1460 cm$^{-1}$) of urea to a lower frequency in urea adsorbed HAP nanoparticles (1446 cm$^{-1}$).

Urea may be adsorbed on the surface of HAP by several binding modes of unequal binding strengths. This can give rise to different binding environments when intercalated within the interlayers of the nanoclay, giving rise to different patterns of release behavior when contacted with acidic soils.

According to the elemental analysis, the urea adsorbed HAP nanoparticles contained 14% C, 5% H, 33% N and 6% P.

Schematic representation (not drawn to scale) of the structure of the urea adsorbed HAP nanoparticles is given in FIG. 5.

Example 3

Intercalation of urea adsorbed HAP nanoparticles into MMT

Three samples of 50 g of Na-MMT were separately dispersed in 750 ml of water.
The following solutions were prepared.
(i) HAP nanoparticles as given in example 1;
(ii) urea adsorbed HAP nanoparticles as given in example 2; and
(iii) 500 ml of 1 M KCl solution.

The above solutions were added drop wise to a Na-MMT suspension separately and the three suspensions were stirred under mechanical stirring to form intercalated materials. The intercalated materials were oven dried at 50° C. for 10 hrs and characterized using XRD, SEM/EDX, FTIR, TGA and NPK analysis. All of the above intercalations were repeated under ultrasonic mixing conditions. There was no significant difference between the two methods with respect to the degree of intercalation.

FIG. 6 represents the XRD patterns of Na-MMT, HAP nanoparticles intercalated into MMT, urea adsorbed HAP nanoparticles intercalated into MMT and K intercalated into MMT.

TABLE 3

Interlayer spacings of parent and intercalated MMTs

| Sample | d-spacing/nm |
|---|---|
| MMT | 1.52 |
| HAP nanoparticles intercalated into MMT | 1.26 |
| urea adsorbed HAP nanoparticles intercalated into MMT | m1.73 |
| K intercalated into MMT | 1.17 |

As seen from FIG. 6 (a), XRD pattern of Na-MMT was found to have an interlayer distance of 1.52 nm. According to FIG. 6 (b) the intercalation of HAP nanoparticles into MMT led to a reduction of the interlayer distance suggesting significant interactions between the HAP nanoparticles and the MMT nanolayers. However, the introduction of urea adsorbed HAP nanoparticles increased the interlayer spacing to 1.73 nm (see FIG. 6 (c)). The absence of peaks corresponding to starting HAP nanoparticles or urea in the XRD pattern of the adsorbed HAP nanoparticles intercalated into MMT suggested the presence of a nanocomposite rather than three individual components.

As seen from FIG. 7(a) in the SEM, the Na-MMT displayed plate like morphology. The intercalation of urea adsorbed HAP nanoparticles did not alter the plate like appearance (see FIG. 7(b)).

FTIR data for MMT and urea adsorbed HAP nanoparticles intercalated into the MMT nanocomposite are given in Table 4.

TABLE 4

FTIR peak assignments for Na-MMT and urea adsorbed HAP nanoparticle intercalated MMT nanocomposite

| Wavenumber/ cm$^{-1}$ | Na-MMT | Wavenumber/ cm$^{-1}$ | Urea adsorbed HAP nanoparticle intercalated into MMT |
|---|---|---|---|
| 3620 | O—H stretching | 3600 broad peak | O—H stretching |
| 1640 | Water bending | 1640 doublet | Peaks due to urea carbonyl and water bending |
| 1140 | Si—O Stretching | 1000 | Si—O Stretching |
| 520 | Al—O Stretching | | |
| 466 | Si—O bending | | |

The FTIR spectra of the urea adsorbed HAP nanoparticles intercalated into MMT nanolayers displayed peaks due to HAP, urea and Na-MMT confirming the presence of the adsorbed HAP nanoparticles within the Na-MMT. Peak broadening at 3600 cm$^{-1}$ suggests an H-bonding environment within the nanoclay interlayer spacing while the shift in metal-oxygen bond at 1100 cm$^{-1}$ account for the surface modification of the clay layers by the urea adsorbed HAP nanoparticles.

Schematic representation (not drawn to scale) of the structure of the intercalated HAP nanoparticles is given in FIG. 8.

Thermal Gravimetric Analysis

The following thermograms were obtained: HAP nanoparticles from Example 1 (see FIG. 9 (*a*)); urea adsorbed HAP nanoparticles from Example 2 (see FIG. 9 (*b*)); and for the MMT, urea adsorbed HAP nanoparticles intercalated into MMT, HAP nanoparticles and urea (see FIG. 10).

Two weight losses were identified for urea as follows (FIG. 10 (*a*)):
  (i) First weight loss approximately up to 200° C. is due to dehydroxylation and removal of ammonia.~70%; and
  (ii) The second weight loss up to 400° C. is due to removal of carbon dioxide.~30%.

Two major weight losses are observed for Na-MMT as follows (FIG. 10 (*d*)):
(i) 10% weight loss up to 180° C. is due to dehydration (adsorbed water); and
(ii) The second weight loss 20% of the total weight is due to collapsing of the clay layers.

A combination of different weight loss stages are found for urea adsorbed HAP nanoparticles intercalated into MMT (FIG. 10 (*b*)). The presence of urea adsorbed HAP nanoparticles within the clay system is established as the same pattern was observed even after extensive washing of the adsorbed HAP nanoparticles intercalated into MMT. This indicates bonding between the HAP nanoparticles and the clay layers.

Example 4

Release behavior of urea adsorbed HAP nanoparticles intercalated into MMT nanocomposite and commercial fertilizer Three soil samples (400 g each of (a) sandy soil found at sea level; (b) soil found at an elevation of 1600 feet in a tea plantation; and (c) soil found at an elevation of 4000 feet in a tea plantation) were each mixed with 1.8 g of commercial fertilizer formulation for tea (T65); the T65 formulation contained urea (N 11%), super phosphate (P 11%) and potash (K 11%); and was purchased from Hayleys Ago Ltd., Colombo, Sri Lanka. These three soil samples containing commercial T65 fertilizer was filled into three glass columns. Similarly, three equal amounts of urea adsorbed HAP nanoparticles intercalated into MMT having an NPK content similar as those used in the commercial samples, were taken separately and filled into three glass columns containing three soil samples (a), (b) and (c) as described above. Next, 180 ml water was added to all six soil columns until they reached the soil water saturation point, and maintained the water content approximately constant throughout the period of study. Water (100 ml) was added at five day intervals prior to elution. The eluted solutions (50 ml) were collected for NPK analysis. NPK analysis was done by Kjeldhal (N), Vanadomolybdate (P) and flame photometry (K).

The N release kinetics data is shown in FIGS. 11 through 13. A slow and sustained release of N over a period more than 2 months for both the acidic soils at elevations of 1600 feet (pH of 4.7) and 4000 feet (pH of 5.2) was observed. For acidic soils at 1600 feet, the amount of N released ranged from 550 to 110 mg from day 1 to day 60. Similarly, at 4000 feet the amount of N released ranged from 846 to 70 mg from day 1 to day 60. However, in the sandy soil samples (pH of 7) non-uniform release was observed. Fluctuations in the N release kinetics are observed in the columns which contained commercial fertilizer. This was attributed a release of a large quantity at about day 4 followed by the release of very low quantities until about day 30 and subsequent depletion to negligible amounts (see FIGS. 11(*a*) to 13(a )). The nitrogen release conditions at soils at an elevation of 1600 feet and 4000 feet indicated the sustained release behavior even after 30 days. See inset of FIGS. 11 to 13.

The P release kinetics data are shown in FIGS. 14 through 16. As seen from these Figures, phosphorous release kinetics was less than optimal levels required for all three types of soils. This may be explained by considering the strong interactions between the two nanosystems that is adsorbed HAP nanoparticles and MMT nanolayers.

Due to strong interactions (as evidenced by the XRD studies) between HAP nanoparticles and clay layers may hold the phosphorous within the system without providing for ready release. Therefore the proposed system should be further modified to introduce controlled release properties for phosphorous.

The K release kinetics data are shown in FIG. 17 through FIG. 19.

The invention claimed is:

1. A macronutrient sustained release composition for a plant locus comprising a nitrogen containing macronutrient compound adsorbed on the surface of hydroxy apatite phosphate nanoparticles, wherein the macronutrient compound adsorbed hydroxy apatite phosphate nanoparticles are intercalated within the interlayer spacing of a nanoclay to form a nanocomposite, and wherein the adsorbed macronutrient compounds are slowly released in a sustained manner to an acidic soil.

2. The composition of claim 1 wherein the nitrogen containing macronutrient compound is urea.

3. The composition of claim 1 wherein the nitrogen containing macronutrient compound comprises urea, thiourea or a mixture thereof.

4. The composition of claim 1 wherein the nanoclay is selected from the group consisting of (a) layered silicates and (b) layered double hydroxides, and mixtures thereof.

5. The composition of claim 1 wherein the acid soil has a pH of about 4 to about 6.

6. The composition of claim 1 wherein the acid soil has a pH of about 4.2 to about 5.7.

7. The composition of claim 1 wherein the macronutrient compound adsorbed hydroxy apatite phosphate nanoparticles have average particle diameter less than 30 nm as measured by particle size analysis based on Brownian motion.

8. The composition of claim 1 wherein the nanocomposite has an interlayer spacing of about 1.73 nm to 8.0 nm after intercalation.

9. The composition of claim 1 wherein the intercalated macronutrient compound is present in an amount of about 10% to about 40% by weight of the nanocomposite.

10. The composition of claim 1 wherein the intercalated macronutrient compound is present in an amount of about 14% by weight of the nanocomposite.

11. The composition of claim 1 wherein adsorbed macronutrient compounds are slowly released in a sustained manner for a period of three months or greater as measured by the potassium and phosphorous content of the acidic soil.

12. The composition of claim 1 wherein adsorbed macronutrient compounds are slowly released in a sustained manner for a period of three months or greater as measured by the nitrogen content of the acidic soil.

13. A method of stimulating plant growth or enhancing plant growth comprising providing the composition of claim 1.

14. The method of claim 13 wherein the plant is tea.

15. A method of macronutrient sustained release to a plant locus comprising:
   a. providing a nanocomposite having nitrogen containing macronutrient compound adsorbed on the surface of hydroxy apatite phosphate nanoparticles, wherein the macronutrient compound adsorbed hydroxy apatite phosphate nanoparticles are intercalated within the interlayer spacing of a nanoclay;
   b. contacting said nanocomposite with an acidic soil; and
   c. releasing the macronutrient compound adsorbed on the surface of the hydroxy apatite phosphate nanoparticles in a slow and sustained manner to the acidic soil.

16. The method of claim 15 further comprising contacting the nanocomposite with the acidic soil multiple times within a period of three months.

17. The method of claim 16 wherein the plant locus comprises a tea plant locus.

18. A process for preparing a macronutrient sustained release composition comprising;
   a. providing hydroxy apatite phosphate nanoparticles and a nanoclay with an interlayer spacing;
   b. contacting the hydroxy apatite phosphate nanoparticles with a nitrogen containing macronutrient compound to form nitrogen containing macronutrient compound adsorbed hydroxy apatite phosphate nanoparticles; and
   c. intercalating the nitrogen containing macronutrient compound adsorbed hydroxy apatite phosphate nanoparticles within the interlayer spacing of the nanoclay.

19. The process of claim 18 further comprising grinding of hydroxy apatite phosphate in the presence of a nitrogen containing macronutrient in an aqueous medium to form the macronutrient adsorbed hydroxy apatite phosphate nanoparticles.

20. The process of claim 19 wherein the hydroxy apatite phosphate is naturally occurring hydroxy apatite phosphate.

* * * * *